United States Patent [19]

Florence et al.

[11] Patent Number: 5,461,411

[45] Date of Patent: Oct. 24, 1995

[54] PROCESS AND ARCHITECTURE FOR DIGITAL MICROMIRROR PRINTER

[75] Inventors: James M. Florence, Richardson; William E. Nelson; Vadlammanti Venkateswar, both of Dallas; James St. Clair, Richardson, all of Tex.; Dirk Broddin; Serge M. F. Tavernier, both of Mortsel, Belgium

[73] Assignees: Texas Instruments Incorporated, Dallas, Tex.; AGFA-Gevaert N.V., Belgium

[21] Appl. No.: 38,398

[22] Filed: Mar. 29, 1993

[51] Int. Cl.[6] .................................................. H04N 1/21
[52] U.S. Cl. ............................................................. 347/240
[58] Field of Search ................................... 346/1.1, 76 L, 346/108, 160, 107 R; 358/296, 300, 302, 298; 347/240, 251, 131

[56] References Cited

U.S. PATENT DOCUMENTS

| 5,285,407 | 2/1994 | Gale et al. | 365/189.11 |
| 5,357,273 | 10/1994 | Carry | 346/108 |

Primary Examiner—Mark J. Reinhart
Attorney, Agent, or Firm—Julie L. Reed; James C. Kesterson; William E. Hiller

[57] ABSTRACT

Techniques for achieving high resolution, high-speed gray scale printing with binary spatial light modulators. A spatial light modulator array is divided into subarrays, and the subarrays are illuminated at various levels (510, 512, 514, 516) of a modulated light source. Additionally, each pixel (520) can be divided up into four phases and printed in phase pairs.

10 Claims, 3 Drawing Sheets

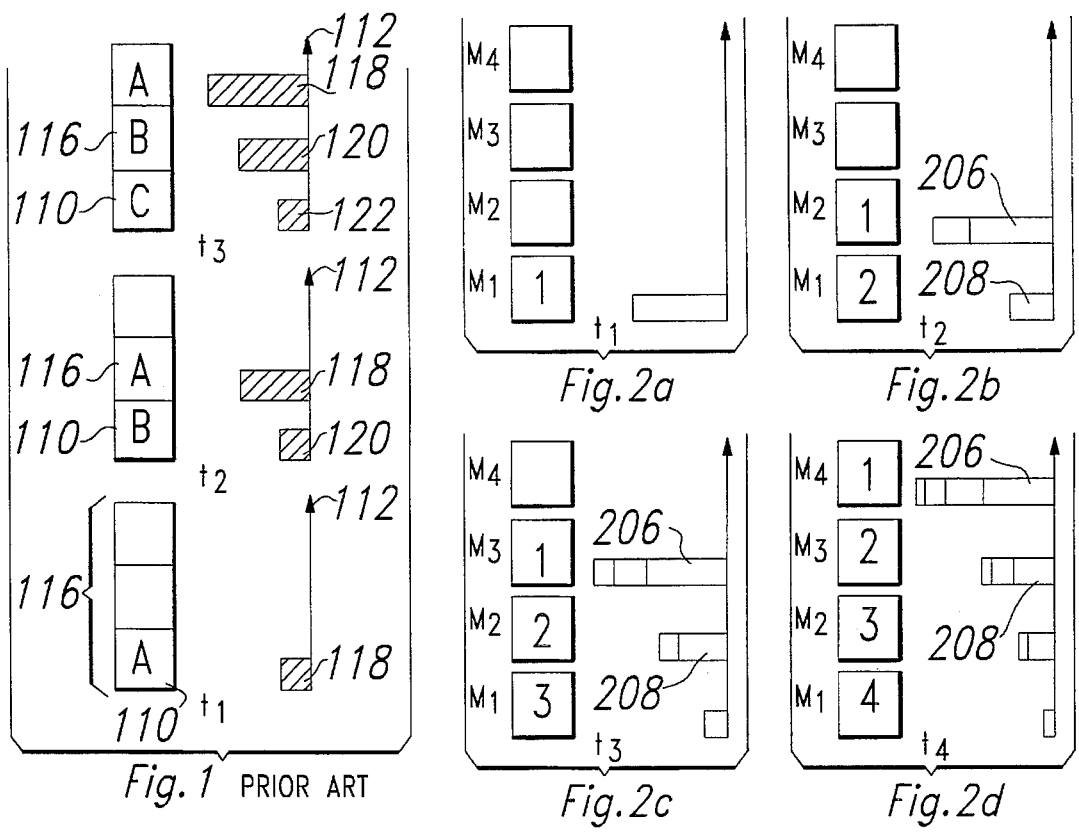
Fig. 1 PRIOR ART
Fig. 2a Fig. 2b Fig. 2c Fig. 2d Fig. 2e Fig. 2f
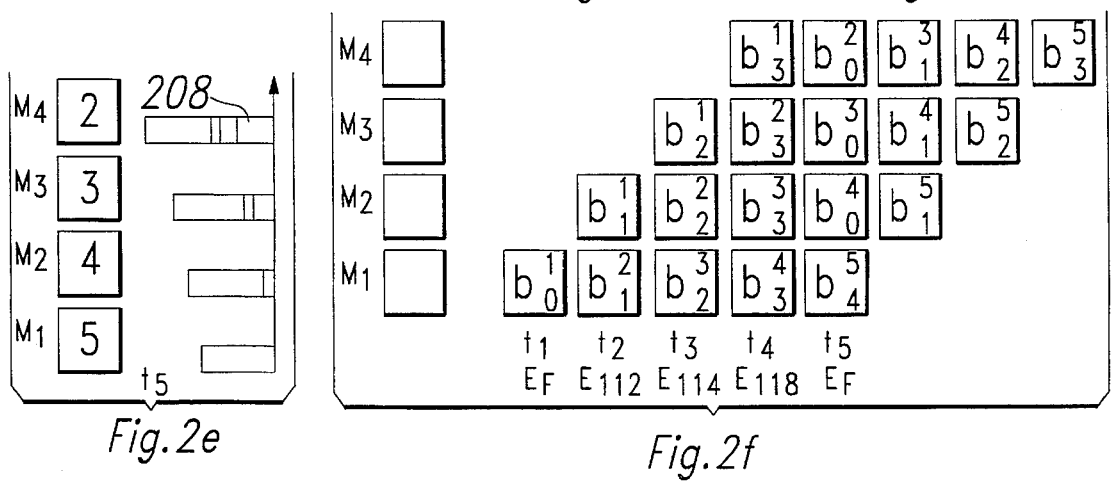
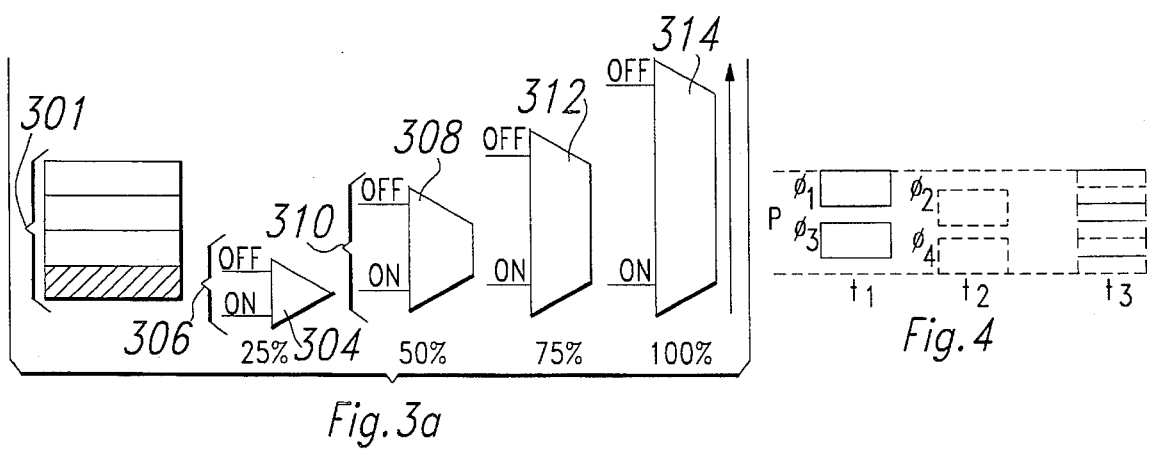
Fig. 3a Fig. 4

PROCESS AND ARCHITECTURE FOR DIGITAL MICROMIRROR PRINTER

BACKGROUND OF THE INVENTION

This application is being concurrently filed with the following applications:

TI-17611, Ser. No. 08/038,391 "GRAY SCALE PRINTING USING SPATIAL LIGHT MODULATORS"; and TI-17335, Ser. No. 08/038,392 "COMBINED MODULATOR SCHEME FOR SPATIAL LIGHT MODULATORS".

1. Field of the Invention

This invention relates to printers, more particularly to printers using spatial light modulators (SLMs).

2. Background of the Invention

An array of individual elements typically comprise a spatial light modulator. Examples of these arrays are Liquid Crystal Devices (LCDs), and Digital Micromirror Devices (DMDs). Some SLMs are binary, that is, their cells are either ON or OFF, others may have a set number of levels. In printing systems that produce gray scales, this causes some problems.

Xerographic printing systems typically use the following process. The print engine receives the data from the source image, such as a computer terminal, or a scanning unit that has scanned an image for reproduction. The printing system converts it to light information, and impinges the light in the correct patterns on a photosensitive drum, causing latent charge patterns on the drum. The drum then rotates past a toner dispenser and attracts toner particles to the latent image on the drum's surface. The drum rotates with these toner particles and transfers them onto substrate, typically a piece of paper. The toner is then fused to the paper, usually with heat, and the paper exits the print engine.

Currently, most of such systems use scanned laser exposure systems for high quality printing. Spatial light modulators are preferred because they potentially offer more functionality for printing. Laser scanning systems print pixel-by-pixel by scanning the laser beam along raster lines. For example, if the user wants to print an 8.5"by 11" paper with 600 dots per inch (dpi) at 40 pages per minute, each page requires 11"×600 dpi, or 6600 lines. At 40 pages per minute this equals 4400 lines per second, where each line has 8.5×600, or 5100 pixels. This requires $22.44 \times 10^6$ pixels per second, allowing 44.6 nanoseconds per pixel. Lasers cannot modulate fast enough in an analog fashion to give gray-scale exposure during the short pixel time. Since SLMs have many light modulating elements that can operate simultaneously, they can be configured to print an entire line of print information at a time. The number of pixels printed per second remains the same, but the SLM approach provides a time that is 5100 times longer (5100×44.6 nanoseconds=227.5 microseconds) to print individual pixels with gray scale modulation.

However, SLMs have their own problems. Because of the nature of their ON/OFF or set number of levels operating mode, production of gray-scale, or shades of gray in between full ON (black) and OFF (no toner) images, becomes very difficult. Each element has the advantages of consistent spot size, shape, and location that makes good quality with sharp images. However, SLM arrays with easily manufacturable resolutions, e.g. 300 dpi, have difficulty rendering curved graphics and fine text features because of the fixes levels of exposure and pixel location limitations.

Therefore, a solution to the above problems offers an opportunity to make printing systems with better quality, lower price, and easier maintainability for more consistent performance.

SUMMARY OF THE INVENTION

The present invention disclosed herein comprises a printing system using a combination of row integration, pulse amplitude modulation, pulse duration modulation, and pulse position modulation to achieve higher quality print. The system uses a light source that can be modulated, a spatial light modulator and a photosensitive medium, typically an organic photoreceptor, but the same process can be applied to film media.

BRIEF DESCRIPTION OF THE DRAWINGS

For a more complete understanding of the present invention and for further advantages thereof, reference is now made to the following Detailed Description taken in conjunction with the accompanying drawings in which:

FIG. 1 shows a diagram of row integration printing.

FIGS. 2a–f show diagrams illustrating examples of pulse amplitude modulation.

FIG. 3a–c illustrates pulse duration modulation.

FIG. 4 shows a pictorial view of pulse position modulation.

DETAILED DESCRIPTION OF THE PREFERRED EMBODIMENTS

Figure 3B:
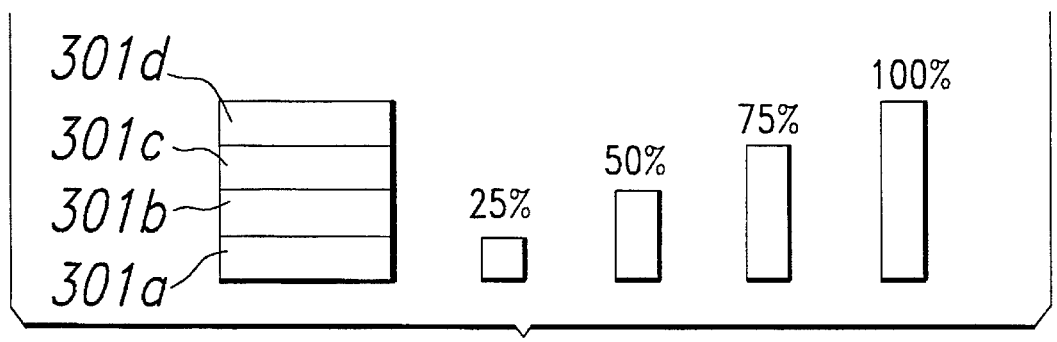

Spatial light modulators typically consist of an array of elements each with its own addressing means. Certain modulators, such as the Digital Micromirror Device (DMD), have memory cells that can receive and store the next frame of data while the current data is being displayed. This allows the data for any pixel to be "moved" between different elements, and even different columns or rows of elements. The data does not really "move", but is put in a position different from its current display position in the next frame of data. This feature allows many different techniques to be utilized in applications such as gray scale printing.

FIG. 1 shows a block diagram of row integration printing, a current technique for lengthening the exposure time of any one piece of data. At $t_1$, the data for the first element of a spatial light modulator (SLM) array column 114 is shown at element 110. The data is represented as A. Arrow 112 shows the movement of the print medium, such as a photosensitive drum relative to the column of elements 114. The data, A, is transferred to the medium for one exposure period. This single exposure period is represented shown as image 118.

At $t_2$, the data for A has passed along the column array to element 116 by either direct transfer within the device, or by reloading the modulator with data A shifted to the new location, and new data, labelled B, is loaded for element 110. The bar graph profile images on the movement arrow 112 have now changed. B's representative image, 120, has one exposure time, but A's image, 118, has now had two exposure times. This process is repeated at $t_3$, where A's image, 118, has now had three exposure times, B's image, 120, has had two exposure times, and the new data in 110, labelled C, has an image of one exposure time 122. This process can be repeated however many exposure times the designer decides is necessary for proper exposure.

In one embodiment of the present invention, row integration is combined with bulk illumination modulation, to allow gray scale images to be formed. The prior art method of row integration allows for gray scale image formation by changing the total number of integrated steps that are used to expose a given pixel (i.e. 16 gray levels can be achieved with 16 integrated rows). The present invention combining row integration with bulk illumination modulation allows gray scale images to be formed with fewer rows (4 binary weighted exposures gives 16 gray levels) or with greater precision (16 rows with 15 full exposure and 1 half exposure give 32 gray levels).

An example of this is shown in FIGS. 2a–2f. For this example, the embodiment assumes that a reflective spatial light modulator such as the Digital MicroMirror Device (DMD) is being used, although any binary spatial light modulator with fast response times could be used. DMDs come in many different dimensions, and this example assumes a DMD with four rows, where only one 4-mirror column is shown as time progresses. FIG. 2a captures the column of 4 mirrors used to generate gray scale at $t_1$ where the very first element of the image receives its data. The light source in this time frame is full illumination. The number 1 in box $M_1$ represents the data for the first picture element of the printed image, or pixel, in a printed column.

At $t_2$, shown in FIG. 2b, the source illuminating the array, such as a light-emitting diode (LED), is at ½ of its full illumination. The paper image of bit 1 has moved to be in line with mirror $M_2$, much like the row integration discussed above. At this point, however, pixel 1 has received 1 full illumination pulse, and a ½ illumination pulse. Its total accumulated illumination pulse is shown by the bar graph 206 with respect to the printed image. Pixel 2, which is directly below pixel 1 in the printed image, has received a ½ illumination pulse, shown by bar graph 208.

Pixel 1's actual total illumination passed onto the paper image may or may not be 1 and ½ illumination pulses. Mirror 1 at $t_1$ could have been on, allowing for 1 illumination pulse, and mirror 2 at $t_2$ could have been off, leaving the actual illumination on the paper at 1 illumination pulse. The phrase total accumulated illumination pulse merely means that pixel has had a chance to receive this level of illumination. The total illumination possible by the four rows of mirrors is 1.875 times the maximum illumination. That is 1 for the full illumination pulse,0.5 for the second pulse, 0.25 for the third pulse, and 0.125 in the fourth, equalling 1.875.

Referring now to FIG. 2c, the source is modulated to be ¼ its full power. Now, pixel 1, currently at mirror $M_3$, now has a total illumination pulse, 206, of 1.75. Similarly in FIG. 2d, pixel 1 has completed its traverse of all possible illumination levels of the source, shown by bar graph 206, having a total possible illumination of 1.875 times full power illumination. Notice that pixel 2 has received ½+¼+⅛, or 0.875 of the total available illumination pulses, in graph 208. In FIG. 2e, pixel 2 completes its possible combinations when it receives the pulse at $t_5$, which is full illumination. Also notice that the next pixel in the column after the four already seen, pixel 5, begins its move through the gray scale.

The data formatting for this scheme is best done away from the array, with the data being sent to the memory cells already formatting to affect pulse amplitude modulation. This is shown in FIG. 2f. The data is formatted as shown in the diagram. The data not shown, such as the three elements above bit 0 at time $t_1$, (data bit numbers are in subscript, where 0=the data bit for full illumination, etc.), for pixel 1 (pixel numbers are in superscript), would be filled with zeros. The exposure levels are shown along the bottom axis, such as $E_F$, which is the full exposure level.

The above example provides 16 possible levels of gray. Each pixel may selectively receive or not receive 4 different illumination intensities, 16 ($2^4$) possible combinations. To increase the number of gray levels to 32, it merely requires adding one more illumination level, 1/16th of full illumination, and grouping the pixel rows in fives. Any number of rows can be grouped, depending only upon the limitations of the system. Additionally, the subset of four could be repeated, giving twice the resolution of the original, or 32 levels, demonstrated below.

| 4 Exposure Levels (Step size = .125) | | 4 Exposure Levels Twice (Step size = .125) | |
|---|---|---|---|
| Power (PWR) | Resolution | Power (PWR) | Resolution |
| 1 | 8 | 1 | 8 |
| .5 | 4 | .5 | 4 |
| .25 | 2 | .25 | 2 |
| .125 | 1 | .125 | 1 |
|  |  | 1 | 8 |
|  |  | .5 | 4 |
|  |  | .25 | 2 |
|  |  | .125 | 1 |
| 1.875 | 15 | 3.75 | 30 |

The above table demonstrates that resolution is based upon how many steps can be reached by the process. Both the power and the resolution were increased by doubling the pattern discussed in FIGS. 2a–2f. Depending upon how starved the system is for power, and the complexity of the addressing circuitry, which must be able to format the data appropriately, many different combinations can be achieved. Some require higher formatting of data, with medium to high power and high resolution. Others can achieve Medium resolution, by eliminating one of the levels of exposure, while attaining high power. The following table demonstrates this. Note that the word "Level" is directed to the level of illumination, not the gray scale level.

| 4 Levels | | 4 Levels Twice | | High Resolution Medium Power | | Medium Resolution High Power | |
|---|---|---|---|---|---|---|---|
| PWR | Res. | PWR | Res. | PWR | Res. | PWR | Res. |
| 1 | 8 | 1 | 8 | 1 | 8 | 1 | 4 |
| .5 | 4 | .5 | 4 | 1 | 8 | 1 | 4 |
| .25 | 2 | .25 | 2 | 1 | 8 | 1 | 4 |
| .125 | 1 | .125 | 1 | 1 | 8 | 1 | 4 |
|  |  | 1 | 8 | 1 | 8 | 1 | 4 |
|  |  | .5 | 4 | .5 | 4 | 1 | 4 |
|  |  | .25 | 2 | .25 | 2 | .5 | 2 |
|  |  | .125 | 1 | .125 | 1 | .25 | 1 |
| 1.875 | 15 | 3.75 | 30 | 5.875 | 47 | 6.75 | 27 |

Up to this point, the techniques have assumed a uniform pixel width in the process direction. More flexibility becomes available in binary spatial light modulation printing when different widths of cells can be generated. This can be achieved in two ways. Both methods will benefit by the use of rectangular pixels, although square pixels will suffice. These techniques are referred to as pulse duration modulation.

FIG. 3a illustrates the first method. In this example, we use the aspect ratio for the rectangular pixels as 4:1. Further, the rectangular pixels are spaced 3 mirrors apart, shown by box 301, which represents a 4 mirror segment of a mirror column. In this example, only the mirror that is hatched is used from column segment 301. Different widths of cells can be generated in the process direction by turning the light source ON for different time durations.

Image 304 shows the length 306 of a pixel image on a piece of paper if the element of the array corresponding to that image was illuminated for 25% of the total line time. This of course assumes that the data being displayed by that image is a 1. If it were a 0, there would be no image. Image 308 shows the length 310 of the pixel image for an element illuminated 50% of the time. Similarly, images 312 and 316 show the respective lengths of 75% illumination time, and 100% illumination time.

Active mirrors would be spaced 3 rows apart from the others, for an effective 4:1 aspect ratio, to generate all four pulse durations on the photosensitive medium. This would employ a scheme similar to the one shown in FIG. 2f, but the subscript would now refer to the pulse duration, rather than the pulse amplitude. Subscript 0 is for 25% duration, 1 for 50% amplitude, etc.

Note that the same effect can be obtained by using only one row of mirrors and switching the data on the mirrors rather than switching the light source. However, this requires loading data into the row four times within a line time, whereas the previous scheme required it only for each line time. Both of these embodiments share the concept of activating and deactivating elements, either by physically doing so in the latter method, or by activating them with light as in the former method.

FIG. 3b shows a second method for achieving the same effect as pulse duration modulation with illumination pulses all of the same length. In this method, multiple contiguous mirrors are used to form printed spots of different widths. In the 4:1 aspect ratio example, this uses 4 rows but does not skip any mirrors. By turning on element 301a the printed spot will have the same width as a 25% pulse duration modulated spot. Turning on 301a and 301b, the width is equivalent to 50% pulse duration, 301a–301c equivalent to 75% duration, and 301a–301d equivalent to 100% duration. To achieve this with an exact 1:2:3:4 ratio and almost no blur, the light must have close to a 0% duty cycle, as shown in FIG. 3b. Higher duty cycles will lead to blur and affect the resulting ratios of the pulse durations, because of the movement of the photosensitive surface.

Both methods for pulse duration modulation benefit by the use of rectangular pixels. Rectangular pixels can result from either rectangular elements on the spatial light modulator array with isomorphic optics, or square pixels with anamorphic optics. Anamorphic optics compress the vertical aspect of a square pixel, such as a DMD, and leave the horizontal aspect alone. This forms a rectangular pixel much like the ones discussed in pulse duration modulation. However, in order to achieve this, a special array would be manufactured that has mirror rows separated by a spacing equal in width to the size of the pixels times the anamorphic compression factor (e.g. for 4:1 aspect ratio the rows would be 4 pixels widths apart). This would allow the pulse duration printing without overlap of the printed pixels. Note that this special array would only be necessary for the true pulse duration modulation shown in FIG. 3a. FIG. 3b uses contiguous mirrors, and therefore does not require this special array.

Figure 3C:
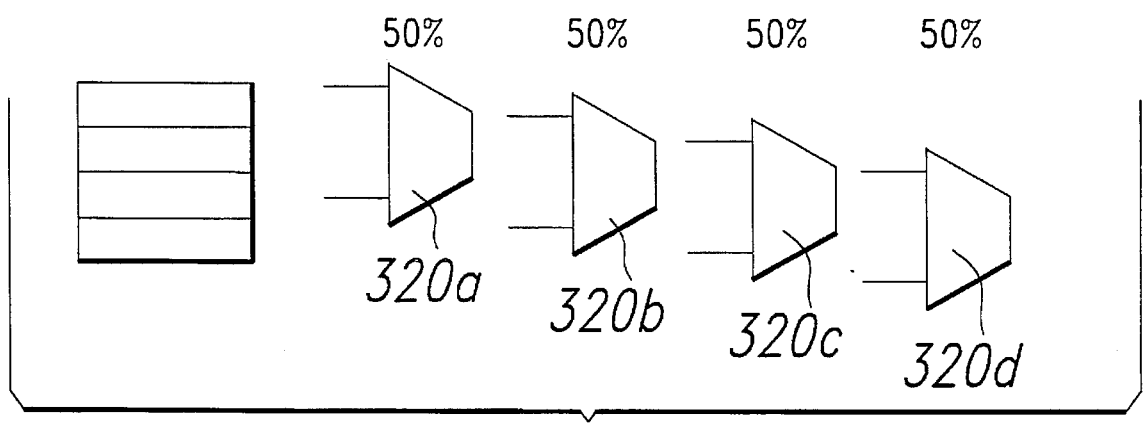

Pulse duration modulation can be modified to achieve pulse position modulation, in which the duration stays constant, but the time the light source turns on is delayed. FIG. 3c shows an example of this. The starting time is delayed and shown at four different times, allowing the pulse to be in a different location on the medium. Each exposure 320a–320d is referred to as a phase.

FIG. 4 shows a phase implementation allowing for a pixel image to be divided into phases, and prints non-overlapping phases together. The example uses 4 phases, but other number of phases could be used, such as 6 phases. The first, third and fifth phases would be printed together, and the second, fourth and sixth would be printed together. Alternatively, the pixel could be printed two phases at a time for 3 exposures. The macropixel, P, has four phases, $\phi_1$ through $\phi_4$. At $t_1$, since they are offset from each other, phases $\phi_1$, and $\phi_3$ are printed together, in rectangular form. At $t_2$, phases $\phi_2$ and $\phi_4$ are printed together. This process allows the four phases of the macropixel P to be printed in two steps instead of four, resulting in the image at $t_3$. Depending upon the density levels of the toner, wider or narrower pixels can appear as gray scale. The combination of toner with many density levels, and the ability to select phases within a macropixel combine to make available greater flexibility in producing gray scale.

Figure 5:
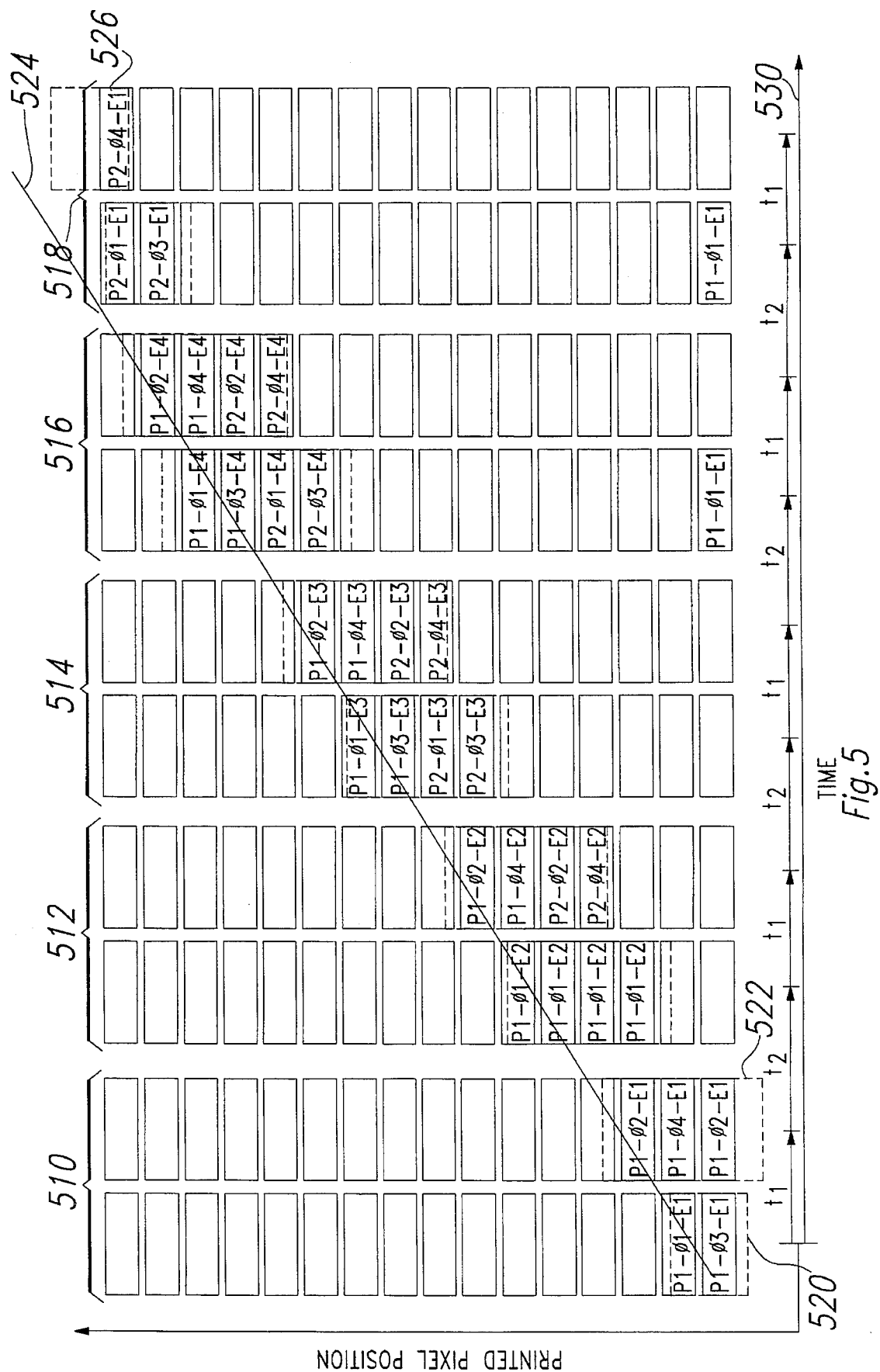
FIG. 5 shows an example of a combination of pulse position modulation and pulse amplitude modulation.

The above techniques can be combined to produce high resolution (600 dpi) gray scale using binary spatial light modulators. A combination of pulse amplitude modulation and pulse position modulation is shown in FIG. 5. Each set of brackets 510, 512, 514, 516 and 518 represent one of the four exposure levels. For discussion purposes, pixel 1, 520, will be tracked across the medium. Note that the movement in the vertical direction is the process direction of the medium, and the movement across the horizontal direction is time. Also, the dashed line box surrounding the pixel pair shows how the phases overlap as they are printed.

Pixel 1, 520, is exposed as phases 1 and 3 at full power in the left column of bracket 510. Three-quarters of a line time later, shown by interval $t_1$ on the time axis 530, phases 2 and 4 are exposed at full power. The time delay must be offset by ¼ a line time to allow for the ¼ pixel offset between the two phase pairs resulting in $t_1$ equalling ¾ of a line time, as discussed in FIG. 4. As in that discussion, the phases may be ON or OFF, and the exposure merely represents the possibility that light has been transferred to the drum.

The macropixel has now been exposed in all four phases, or both phase pairs, for the full illumination level. Bracket 512 represents the exposures at ½ full illumination. The delay between bracket 510 and 512, shown by interval $t_2$ on the time axis, is ⁵⁄₄ of a line time. The pixel is now transferred to the next element or set of elements that comprise a macropixel, as discussed in FIG. 2. Again an extra ¼ line time is needed to accomplish the offset between the phase pairs. This process then repeats along line 524 for this particular macropixel until, in bracket 518, it receives the phase pair for the ⅛th level of illumination. At that point, that particular macropixel is completed for that set of rows. As mentioned in reference to the tables above, the pixel may receive a repetition of that set of row.

Note that in the right column of bracket 510, phase 2 for pixel 2 is exposed. It follows much that same course as pixel 1, 520, except that phase 4 does not receive its exposer at full power until the right column of bracket 518, in position 526. This cycling occurs between each pixel in the column. This technique is not limited to only four pixels. As mentioned above it can be done for as many pixels as the designer desires, limited only by the capabilities of the array and the electronics.

Thus, although there has been described to this point particular embodiments of gray scale printing with binary spatial light modulators, it is not intended that such specific references be considered as limitations upon the scope of this invention except in-so-far as set forth in the following claims.

What is claimed is:

1. A method of pulse amplitude modulation comprising:
   a) providing a spatial light modulator array having subarrays comprising a predetermined number of rows;
   b) loading data corresponding to an exposure level of a light source for a pixel into the addressing circuitry for an element of said array;
   c) exposing said element with Said exposure level to selectively image or not image said data upon a photosensitive medium;
   d) loading data corresponding to the next exposure level of said source, wherein said data will be loaded into the circuitry for a different element if necessary to coordinate the movement of said data within said subarray to the movement of said medium;
   e) exposing said element with said next exposure level to selectively image or not image said data upon said photosensitive medium; and
   f) repeating said loading and exposing steps until said element has been exposed for every one of a predetermined number of exposure levels.

2. The method of claim 1 wherein said spatial light modulator comprises a digital micromirror device.

3. The method of claim 1 wherein said predetermined number of rows equals four.

4. A method for pulse duration modulation comprising:
   a) activating an element of a spatial light modulator array to produce a pixel image on a moving medium; and
   b) de-activating said element a predetermined interval after said activation step, such that light exposed onto said medium forms said pixel, the length of which in the process direction is proportional to the length of said predetermined interval, thereby allowing control of the size of said pixel.

5. The method of claim 4 wherein said activating and de-activating steps are accomplished by turning on and off the light source respectively.

6. The method of claim 4 wherein said activating and de-activating steps are accomplished by turning on and off said elements respectively.

7. A method for pulse duration modulation comprising:
   a) defining a macropixel from a predetermined number of elements of a spatial light modulator array;
   b) selecting a contiguous subset of said predetermined number of elements; and
   c) selecting the duration of the pulse to be proportionate to the size of the subset of said predetermined number.

8. The method of claim 7 wherein said spatial light modulator comprises a digital micromirror device.

9. The method of claim 7 wherein said pulse is positioned by fixing the duration of said pulse and delaying the time said pulse turns on.

10. A method for pulse position modulation comprising:
    a) dividing a pixel into a number of phases in the process direction, wherein each phase is selected such that each phase is offset from adjacent phases by a length substantially equivalent to one divided by said number of phases within the pixel;
    b) exposing a subset of said phases, wherein said subset comprises phases that are separated from each other by at least one phase; and
    c) exposing previously unexposed phases to complete an exposure at a given illumination level for said pixel.

* * * * *